United States Patent [19]

Ostuni

[11] Patent Number: 5,937,083
[45] Date of Patent: Aug. 10, 1999

[54] IMAGE REGISTRATION USING CLOSEST CORRESPONDING VOXELS WITH AN ITERATIVE REGISTRATION PROCESS

[75] Inventor: John Ostuni, Rockville, Md.

[73] Assignee: The United States of America as represented by the Department of Health and Human Services, Washington, D.C.

[21] Appl. No.: 08/847,733

[22] Filed: Apr. 28, 1997

Related U.S. Application Data

[60] Provisional application No. 60/016,429, Apr. 29, 1996.

[51] Int. Cl.⁶ ........................................................ G06K 9/00
[52] U.S. Cl. ........................ 382/131; 382/131; 382/294; 364/413.13
[58] Field of Search ................................. 382/154, 131, 382/285, 294; 364/413.13, 413.22; 395/119, 125, 127

[56] References Cited

U.S. PATENT DOCUMENTS

| | | | |
|---|---|---|---|
| 4,737,921 | 4/1988 | Goldwasser et al. | 364/518 |
| 4,945,478 | 7/1990 | Merickel et al. | 364/413.19 |
| 5,313,567 | 5/1994 | Civanlar et al. | 395/119 |
| 5,568,384 | 10/1996 | Robb et al. | 364/413.13 |
| 5,633,951 | 5/1997 | Moshfeghi | 382/131 |

OTHER PUBLICATIONS

Li, H., et al., "Automatic EO/IR Sensor Image Registration", *IEEE* (©1995), 0–8186–7310–9/95, pp. 161–164.

Van den Elsen, P.A., et al., "Automatic Registration of CT and MR Brain Images Using Correlation of Geometrical Features", *IEEE Transactions on Medical Imaging*, vol. 14, No. 2, Jun. 1995 (New York), pp. 384–396.

Herbin, M, et al., "Automated Registration of Dissimilar Images: Application to Medical Imagery", "*Computer Vision, Graphics and Image Processing*", vol. 47, No. 1, ©1989 Academic Press, Inc.), pp. 77–88.

V. Dousset, MD, et al., "Experimental Allergic Encephalomyelitis and Multiple Sclerosis: Lesion Characterization with Magnetization Transfer Imaging," *Radiology* (Feb. 1992); vol. 182, pp. 483–491.

V.S. Mattay, MD, et al., "Brain Mapping with Functional MR Imaging: Comparison of Gradient–Echo–Based Exogenous and Endogenous Contrast Techniques," *Radiology*, (Mar. 1995), vol. 194, No. 3, pp. 687–691.

R. P. Woods, et al., "Rapid Automated Algorithm for Aligning and Reslicing PET Images," *Journal of Computer Assisted Tomography*, (Jul./Aug. 1992), 16(4), pp. 620–633.

R.P. Woods, et al., "MRI–PET Registration with Automated Algorithm," *Journal of Computer Assisted Tomography*, (Jul./Aug. 1993), 17(4), pp. 536–546.

M. Herbin, et al., "Automated Registration of Dissimilar Images: Application to Medical Imagery," *Computer Vision, graphics, and Image Processing*, No. 47 (1989), pp. 77–88.

N.M. Alpert, et al., "The Principal Axes Transformation— A Method for Image Registration," *Journal of Nuclear Medicine*, vol. 31, No. 10 (Oct. 1990), pp. 1717–1722.

C.A. Pelizzari, et al., "Accurate Three–Dimensional Registration of CT, PET, and/or MR Images of the Brain," *Journal of Computer Assisted Tomography*, 13(1), (Jan./Feb. 1989), pp. 20–26.

(List continued on next page.)

*Primary Examiner*—Christopher S Kelley
*Assistant Examiner*—Sheela Chawan
*Attorney, Agent, or Firm*—Philip H. Albert; Townsend and Townsend and Crew

[57] ABSTRACT

A robust, automatic volume registration process based on intensity gradients successfully performs registrations under conditions of unrelated intervolume voxel intensities, significant object displacements and/or significant amounts of missing data. The process allows a user to visualize the registration convergence, clearly illustrating any source of registration errors. The process includes steps of matching, based on iteratively finding a correspondence of the closest voxels containing a high three-dimensional (3D) intensity gradient magnitude. The process is a powerful method of sequence-independent MR volume registration which is simple to both use and understand.

19 Claims, 9 Drawing Sheets

OTHER PUBLICATIONS

H. Jiang, et al., "Image Registration of Multimodality 3–D Medical Images by Chamfer Matching," *Biomedical Image Processing and Three Dimensional Microscopy,* (1992) SPIE vol. 1660, pp. 356–366.

P.J. Besl, et al., "A Method for Registration of #–D Shapes," *IEEE Transactions on Pattern Analysis and Machine Intelligence,* vol. 14, No. 2, (Feb. 1992), pp. 239–256.

B.K.P. Horn, et al., "Closed–Form Solution of Absolute Orientation Using Orthonormal Matrices," *J. Opt. Soc. Am. A.,* vol. 5, No. 7 (Jul. 1988), pp. 1127–1135.

Fig. 4A. Proton Density Slice

Fig. 4B. T2-Weighted Slice

Fig. 4C. Proton Density Gradient Image

Fig. 4D. T2-Weighted Gradient Image

IMAGE REGISTRATION USING CLOSEST CORRESPONDING VOXELS WITH AN ITERATIVE REGISTRATION PROCESS

CROSS REFERENCE TO RELATED APPLICATIONS

This patent application is related to a U.S. Provisional patent application entitled "Image Registrations Using Voxel Gradients With an Iterative Registration Process" U.S. Provisional Application No. 60/016,429, which was filed on Apr. 29, 1996, by John Ostuni, the disclosure of which we claim priority and is incorporated by reference.

BACKGROUND OF THE INVENTION

The present invention relates to volume imaging, in particular to a novel method and apparatus for registering volume images.

The term "image", as used herein, refers to a volume image, unless otherwise indicated. A volume image is the three-dimensional (3D) analogue to a two-dimensional (2D) image. A 2D image can be represented for digital image processing purposes as a collection of pixels, where each pixel has a location (usually specified by x,y coordinates) and a color value. An image is formed on a display (or printer) when the pixels (or print dots) are colored according to their color value and placed at their location.

A 2D image is a representation of a flat view, as might be found on a computer monitor, newspaper, X-ray, or the like. Although the 2D image might be of a 3D object, the image itself is 2D, because of the way it is captured. For example, an X-ray is a 2D image because it contains no depth information, even though the X-ray might be of a patient's internal organs (a 3D object). If a 3D image of a 3D object is desired, a volume image should be captured instead of a 2D image.

The term "pixel", as used herein, will at times refer to an actual display element, such as a single picture element of a computer display, but at other times will refer to an identified location on a printed page where a dot of color could be placed, or a location on a image which exists only in the memory of a computer as an array of pixel values. Typically, where the image is stored in a memory of a computer, the pixel locations are not stored, but are implied from the pixel's position in the dataset, file, or memory block in which the "image" is stored.

The term "pixel color value", or "color" for short, refers to the value of the pixel, which can be a color or a shade of gray, depending on the palette. Common palettes include 24-bit color, 8-bit monochrome (shades of gray) and one bit color. One-bit color is often referred to as "black and white", but it should be apparent that any other assignment of two colors to the two possible color values would be equivalent. A one-bit color image is often referred to as a binary image, since all of the pixels take on one of two color values.

The capturing of volume images is well known in the medical field. MR (magnetic resonance) techniques and tomography are but two examples of volume image capture methods. A volume image is typically stored in a computer memory as an array of "voxels" where each voxel has a location in 3D space (e.g., x, y and z coordinates) and a voxel color value. Where the volume image is a monochrome image, the voxel color value is the "intensity" of the voxel. Thus, a voxel is the basic element of a volume (3D) image in the same way that a pixel is the basic element of a 2D image.

While a volume image might be displayed on a 2D display, it is nonetheless stored as a volume image in the computer memory. One advantage of a volume image over a 2D image is that the volume image can be displayed in three dimensions on a 3D display, such as might be used by a doctor or radiologist to noninvasively examine internal organs of a patient. Even if a 3D display device is not used, volume images have another advantage over 2D images, in that the position of a 2D "slice" through the volume image displayed on a 2D display device can be changed. Often a diagnostician can get a good idea of what the 3D image of the internal organs looks like by just viewing a 2D image slice and manipulating the position of the slicing plane.

"Registration" refers to the process of aligning two or more related images. These images can represent the same data type or different data types (such as proton density MR, T2-weighted MR, PET, etc.). This data is typically taken of some patient, but possibly from differing views (distance and angle). Registration can also be used to align two or more subimages which contain the same type of data but are multiple images taken with partial overlaps. This latter application is akin to the process of taking multiple vacation photographs of a landscape and taping them together to form a large panoramic collage. For such a panorama effect to work, the photographs must be aligned ("registered") so that the scene is continuous from one photograph to the next. To register the photographs, there must be some image overlap from photograph to photograph.

Automatic registration, such as might be performed by a digital computer is known. The input to such an automatic registration process is two images and the output of the process is a transformation matrix. The transformation matrix is a set of parameters which indicates how one of the images should be transformed relative to some fixed coordinate system to bring the two images into alignment. Of course, the output of the process could just be the combination of the two images, but it is often more compact and useful to store just the transformation matrix. With more than two images, registration can be performed serially, with the third and subsequent images registered to the first in order to allow accurate time or other variation analysis.

With 2D images, a transformation matrix need only specify a planar transformation. With volume images, a transformation matrix is more complicated, as it needs to specify a transformation in a 3D space. A planar transformation can include a rotation within the plane, translation in one or two directions, and a scaling in one or more directions, while a 3D transformation can comprise their analogues in a coordinate space.

Registering volume images is increasingly important as medical tomography and MR become more and more prevalent diagnostic tools. Researchers are discovering that some useful information only exists through the registration and combination of volumes containing object information. For example, a patient might undergo one scan with a particular paramagnetic contrast material administered to the patient and a certain MR sequence, then undergo a second scan with different conditions. The results of these two scans, when overlaid and registered, might provide insights to the diagnostician where none could be obtained by viewing the results separately. For examples of experiments using multiple MR sequences, see (1) V. Dousett, et al., "Experimental Allergic Encephalomyelitis and Multiple Sclerosis: Lesion Characterization with Magnetic Transfer Imaging", *Radiology* 182:483–491 (1992). "Sequence" refers to the particular pulse sequence used for an MR scan.

One inherent problem with automatic registration of images created using different imaging methods is that the voxel intensities used to represent a particular tissue using one method are often different and unrelated to the voxel intensities used by another method. The voxel intensities might be different due to different imaging modality, MR sequence parameters or changes in the patient's physiology from one scan to the next. This can cause problems for registration algorithms which expect a specific relationship between intervolume voxel intensities.

There are many other techniques that attempt to perform image registration by assuming specific relationships among voxel intensities, such as R. Woods, et al., "MRI-PET Registration with Automated Algorithm", *Journal Computer Assisted Tomography* 17(4):536–546 (July/August 1993; hereinafter "Woods I"), describes one solution to the problem of volume registration. There, the goal was to register MRI and PET volumes of the brain. The problem with MRI and PET volumes is that different types of tissue have different intensities, and the intensities bear no simple relationship. The solution provided by Woods I is to manually edit the MR images to remove nonbrain structures. This manual editing is time consuming and allows the registration to be too user dependent. The remaining image is partitioned into components based on the values of the MRI voxels in a way which maximizes the uniformity of the PET voxels in each component, but the assumption there is that all MRI voxels with a particular value represent the same type of tissue, so the corresponding PET voxels should have similar values to each other. See also, R. Woods, et al., "Rapid Automated Algorithm for Aligning and Reslicing PET Images", *Journal Computer Assisted Tomography* 16(4):620–633 (July/August 1992) (hereinafter "Woods II") and M. Herbin, et al., "Automated Registration of Dissimilar Images: Application to Medical Imagery", *Computer Vision, Graphics, and Image Processing* 47:77–88 (1989).

One way to avoid the problem of registering multiple images or multiple subimages with differing intensity levels is to estimate the orientation of the structure in 3D space instead of attempting to match voxel intensity, as shown by N. Alpert, et al., "The Principal Axes Transformation—A Method for Image Registration", *Journal of Nuclear Medicine* 31:1717–1722 (October, 1990). Unfortunately, changes in patient placement create regions of uncommon data which adversely affect these types of algorithms.

As shown by C. A. Pelizzari, et al., "Accurate Three-Dimensional Registration of CT, PET and/or MR Images of the Brain", *Journal of Computer Assisted Tomography* 13(1):20–26 (January/February 1989); H. Jiang, et al., "Image Registration of Multi-Modality 3-D Medical Images by Chamfer Matching", SPIE Vol. 1660 *Biomedical Image Processing and Three-Dimensional Microscopy* 356–366 (1992) and P. J. Besi, et al., "A Method for Registration of 3-D Shapes", *IEEE Transactions on Pattern Analysis and Machine Intelligence* 14(2):239–256 (February 1992), contour methods will avoid differences in tissue-based voxel intensity relations, but such methods ignore a large amount of internal object information which is useful for calculation of an accurate transformation matrix. This information is particularly important when one considers the limitations of contours due to occlusion, partial volume effects and image noise.

Yet another approach is to use voxel intensity as the substrate for more complicated comparison metrics to guide coregistration. Typically, these methods require substantial image processing, considerable computing time and are theoretically complex, making it difficult to understand why coregistration might fail in any particular instance.

Therefore, what is needed is improved registration of multiple volume images or multiple volume subimages which works even when the images to be registered have no direct relationship between intensity levels, varying patient placement (in the case of medical images), occlusion and noise.

SUMMARY OF THE INVENTION

In one embodiment of a medical imaging system according to the present invention, images to be registered are converted to gradient images, which are images where each voxel value represents the magnitude of the change in intensity between itself and its neighboring voxels. Preferably, two images are registered at a time, and if more than two images need to be registered, the third and subsequent images are registered to the initial image.

One method for registration of gradient images is to create a binary gradient image according to a gradient threshold, where the gradient threshold is proportional to an average gradient value and the proportion is interactively settable by a user. In a specific implementation, the images are filtered first by removing from consideration voxels which have a voxel value outside a specified range. A gradient threshold is then determined. One way used to determine a gradient threshold is to take an average gradient value of the voxels which are in the specified range. The average gradient value is multiplied by a gradient multiplier supplied by the user to arrive at a gradient threshold. This threshold is used to create a binary image where the value of "1" is given to voxels where intensity gradient is higher in magnitude than the gradient threshold. These voxels are referred to here as "gradient voxels." The voxels whose intensity gradient is not higher than the gradient threshold are given a value of "0" and are referred to as "nongradient voxels." The voxel value range selection can be used to eliminate background and other unwanted voxel values and the gradient multiplier can be used to change the degree of detail which is present in the binary gradient image. Once the binary gradient images which are to be registered are created, the second image is transformed into the coordinate space of the first volume according to an initial registration transformation estimate.

Next, each gradient voxel in the first image is matched with its closest gradient voxel or voxels in the second image if any gradient voxels can be found in the second image within a maximum search distance from the first gradient voxel. The same is done with gradient voxels in the second image. This matching creates a set of corresponding gradient voxel pairs. Once this set of correspondence pairs is determined, it is used to adjust the registration transformation matrix. More precisely, a transformation is found which minimizes the distance between the voxels of these correspondence pairs. The minimization can be based upon any transformation type, such as rigid body, affine, etc. This correspondence transformation is then used to adjust the registration transformation matrix. This process is continually repeated until the correspondence transformation is approximately identity, meaning there will be no subsequent change in the registration transformation matrix. At this point, the maximum search distance is decreased and the entire process begins again. The registration is completed when the correspondence transformation is approximately identity and the maximum search distance is one. Instead, the maximum search distance can be decreased when the correspondence transformation is sufficiently close to identity. For each iteration, the search for corresponding pairs begins anew so that the minimization process improves the fit.

One advantage of the present invention is that it aligns areas of large intensity differences which typically represent areas of tissue change. Some subset of this tissue change will appear on almost any two images, irrespective of the method used to acquire the images. Another advantage is that all errors are averaged over the entire volume so noise, occlusion and areas of incorrectly corresponding gradient voxels have minimal effect.

In some variations of the above medical imaging system, 2D images, partially overlapping images and images taken under common conditions are also registered. In other variations, certain gradient voxels are unwanted and are removed from the images before the gradient voxels are matched, or at some other point in the process. The removal of unwanted gradient voxels is useful, among other applications, in systems where multimodality imaging is used and gradient voxels due to the scalp must be removed. Different filtering methods can be used on the gradient voxel images in order to remove large quantities of gradient voxels located at well defined locations.

Yet further variations of the imaging system use other methods of determining voxel gradients, other methods of eliminating unwanted voxels, and/or other methods of arriving at a gradient threshold.

A further understanding of the nature and advantages of the inventions herein may be realized by reference to the remaining portions of the specification and the attached drawings.

BRIEF DESCRIPTION OF THE DRAWINGS

FIG. 4A is a proton density slice with approximately 256 shades of gray; FIG. 4B is a T2-weighted slice with approximately 256 shades of gray; FIG. 4C is a slice of a gradient voxel image derived from the voxel image represented in FIG. 4A; and FIG. 4D is a slice of a gradient volume image derived from the volume image represented in FIG. 4B.

DESCRIPTION OF THE SPECIFIC EMBODIMENTS

The present invention is described herein with reference to a specific implementation. The specific implementation is used to register two magnetic resonance (MR) volume images of a patient's brain. As should be apparent after reading this disclosure, the implementation can be expanded for use in other applications and for more than two images. For example, the scans (MR or otherwise) might be of another body part, or even a machine part. The overlay of multiple sequences of a machine part might be used, for example, to highlight defects in the machine part.

Figure 1:
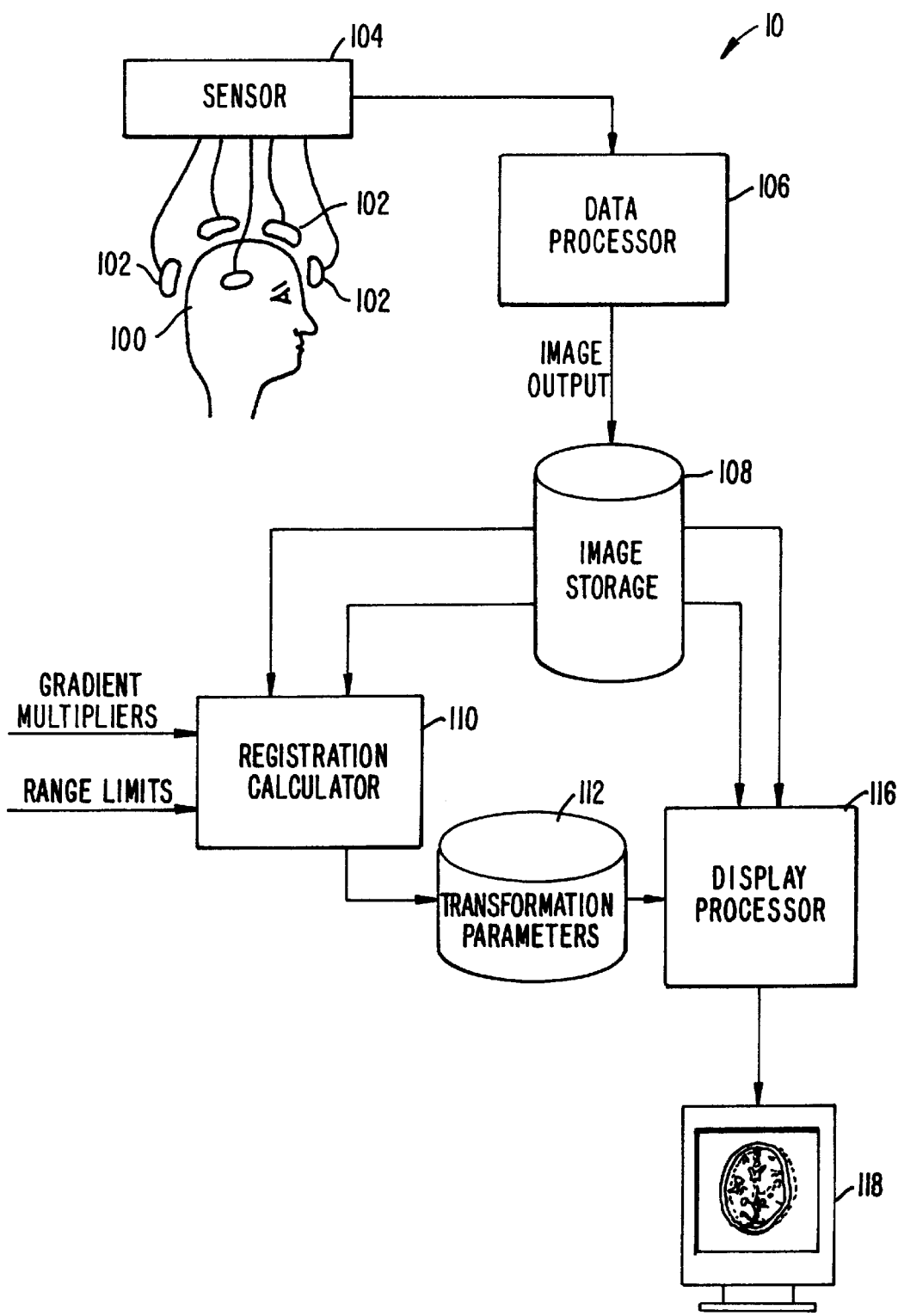
FIG. 1 is a block diagram of an image capture and processing system according to the present invention.

FIG. 1 is a block diagram of an image capture and processing system 10 according to the present invention. System 10 obtains scan data of a patient's brain 100 using sensors 102 and MR unit 104, such as the 1.5-T MR unit sold by General Electric (Milwaukee, Wis.), as is well known in the art of MR scanning. MR unit 104 picks up sensor data in three dimensions representing the tissue of the patient's brain. MR unit 104 sends the sensor data to a data processor 106 which correlates the sensor data with sensor position to generate a volume image map of the patient's brain. Data processor 106 stores the volume images in an image storage device 108. Examples of slices of such volume images are shown in FIGS. 4A, 4B.

A registration calculator 110 reads two volume images from image storage device 108 and registers the images to produce a registration transformation matrix relating the two images. The registration transformation matrix is stored in a memory 112, which can be computer memory, random access memory (RAM), disk storage, tape storage, or the like. The registration transformation matrix is used by a display processor 116 to align the two images read from image storage device 108 and display them on computer display 118 overlapped as prescribed by the registration transformation matrix. Standard data processing and programming techniques can be used to store images and associate matrices with the appropriate images, such as indexing and the use of pointers.

In a preferred embodiment, registration calculator 110 and display processor 116 are implemented in software on a conventional computer coupled to a conventional display.

Figure 2:
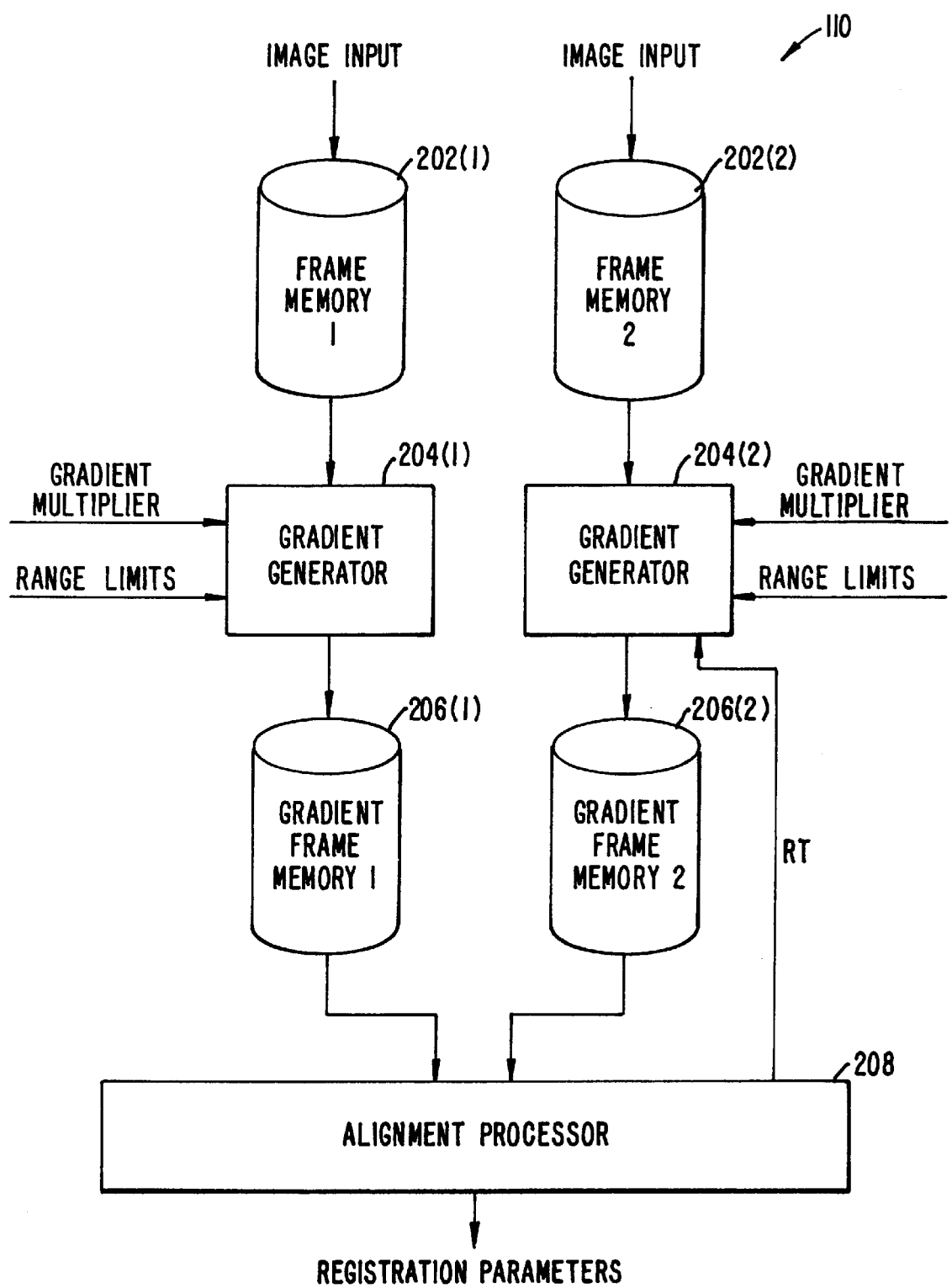
FIG. 2 is a module diagram illustrating the various modules of a software implementation of a volume image registration program according the present invention.

FIG. 2 is a module diagram of registration calculator 110. Only the major data elements and procedure blocks are shown; other variable storage and procedures are included where necessary. As shown in FIG. 1, the inputs to registration calculator 110 are the two images being registered (Image 1 and Image 2), and the user inputs of a gradient multiplier value and a range limit for each volume, while the output of registration calculator 110 is a set of registration parameters. In this case of processing two volume images, the registration parameters are the coefficients of a transformation matrix which, when applied to one of the images, will align that image with the other image by transforming it in 3D space.

The major elements of registration calculator 110 are frame memories 202(1,2), gradient generators 204(1,2), gradient frame memories 206(1,2) and an alignment processor 208. As should be apparent, a generic computer memory can be used for frame memories 202 and gradient frame memories 206, and with proper timing, a single memory block can be used for both frame memory and gradient frame memory at different times. Preferably, the second volume remains in memory for reuse in generating a new gradient frame for each updated transformation matrix (this process is described in below in greater detail; see S6 in FIG. 3).

It should also be apparent that the images can be stored in a compressed form. In a preferred embodiment, gradient generators 204 and alignment processor 208 are modules of an integrated processing program, but might be distributed over multiple processors to obtain the benefits of parallel processing.

In operation, registration calculator 110 reads in two images into frame memories 202 and generates binary gradient images which are stored in gradient frame memories 206. A gradient generator 204 operates on its respective image by examining the voxel values of the image and labelling each voxel as being either a gradient voxel or a nongradient voxel.

Voxels with values outside the user-specified range limits (or voxel failing some other "voxel of interest" test) are ignored. For example, if voxel values can range from 0 to 255, the user might opt to ignore values of 0 and 255 on the theory that many out-of-range readings on either end of the range are incorrectly stored as end-of-range values. To effect this, the user would specify a range limit of 1 to 254. The range limits might also be used to eliminate unwanted background information or noise, or to mask out specific features in each volume image. User-specified range limits are just one way to filter out unwanted gradient voxels. Other methods might be used, depending on the data, to remove components of a volume when doing multimodality imaging, or to remove large quantities of gradient voxels located at well defined locations.

Once unwanted voxels are eliminated, the wanted voxels are examined to determine gradient values for those voxels. Each voxel, except for those at the edges, is touched by 26 other voxels, forming a 3×3×3 cube centered on the touched voxel. In a specific embodiment, a 3D Prewitt operator is applied to each wanted voxel to determine a gradient value for that voxel. The gradient of a voxel used here is the square root of the sum of the squares of the gradients in each of the three axes. In equation form, the gradient, G, for a voxel, V, is expressed as:

$$G(V) = \sqrt{(\Delta x)^2 + (\Delta y)^2 + (\Delta z)^2} \quad (1)$$

where Δx is the difference between the sum of the intensities of the nine voxels to the right of V and the sum of the intensities of the nine voxels to the left of V, Δy is the difference between the sum of the intensities of the nine voxels above V and the sum of the intensities of the nine voxels below V, and Δz is the difference between the sum of the intensities of the nine voxels in front of V and the sum of the intensities of the nine voxels in back of V. As should be apparent from this description, gradient kernels other than the 3D Prewitt operator can be used with similar results.

If the volume image is not already sampled isotropically, the volume is preferably resampled so that the voxels are isotropic before the gradients are calculated. Typically, the gradient information describes all of the interesting features of a volume image, such as tissue changes and object borders. The speed of registration is improved since regions of homogeneous tissue, where little registration information exists, are ignored (i.e., labelled as nongradient voxels or ignored voxels).

Once the gradients are calculated, an average gradient value is calculated and multiplied by the user-supplied gradient multiplier to set a gradient threshold. This allows a user to set a similar threshold for images formed from different imaging methods. Typically, once the best input values (gradient multiplier and range limits) are found for a pair of imaging methods for a particular part of the body, the values generally are not changed. All voxels with a 3D intensity gradient above the threshold are labelled gradient voxels, while all remaining voxels are labelled nongradient voxels. Logically, then, a gradient image is a binary image with voxels having one of two values, the two values being "gradient" and "nongradient", which might be represented in memory by 0's and 1's, respectively. In FIGS. 4C and 4D, gradient voxels are indicated by black dots. Of course, with unwanted voxels, a gradient image might contain voxels with a third value, that of an "ignored voxel." In addition to unwanted voxels, edge voxels might also be labelled as ignored voxels.

The process of generating gradient images is done independently for each volume image. As should be apparent from the above, a single instance of gradient generator 204 can be used instead of one instance per image. Typically, the input values (gradient multipliers, range limits) are set for a particular type of image, so that the user might enter the same input values each time a particular type of image is analyzed.

Figure 3:
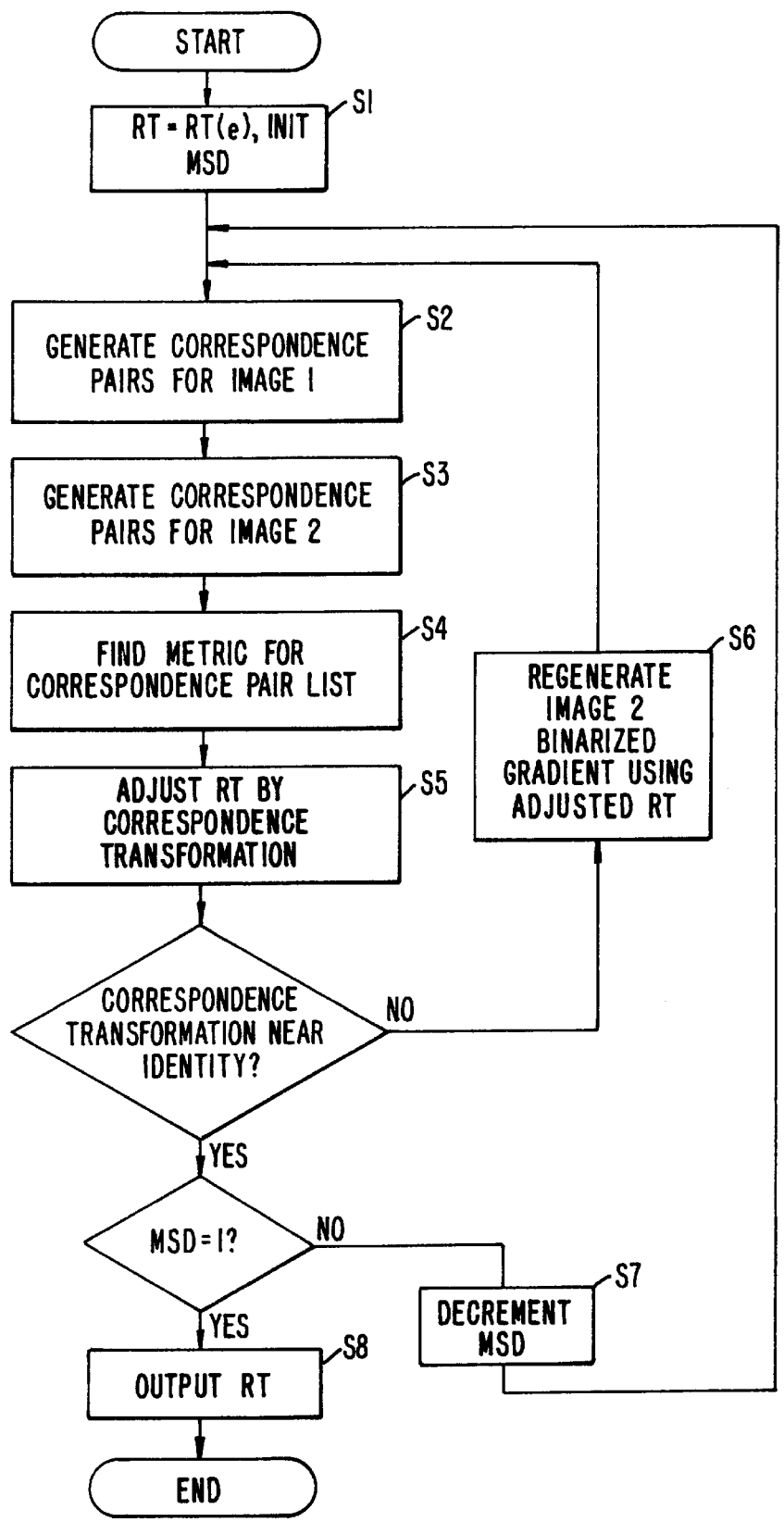
FIG. 3 is a flow chart of a process for volume image registration according to the present invention.

Once the gradient voxel images are generated, alignment processor 208 operates on the gradient voxel images according to a process such as the process illustrated in FIG. 3. FIG. 3 is a flowchart showing various steps numbered beginning with step "S1" and continuing in ascending order except where otherwise indicated. At step S1, processor 208 initializes variables representing a registration transformation, RT, to an initial estimate, RT(e), which is typically the identity matrix. RT relates the two images such that they exist logically in a common coordinate space. Since they are in a common coordinate space, distances can be measured from a voxel in one image to a voxel in the other image. A maximum search distance variable MSD, is also initialized to a nonzero value measured in units of voxels.

In step S2, each of the gradient voxels in Image 1 is examined in turn. If a gradient voxel exists in Image 2 at the location of the Image 1 voxel being examined, an entry is added to a correspondence list linking those two voxels as a "correspondence pair". If a gradient voxel does not exist at that point, a search is performed for gradient voxels one voxel unit away, then two voxel units away, etc., up to the maximum search distance. The locations of the gradient voxels of each pair is stored in the list. If more than one gradient voxel is found the same distance away, a correspondence pair is made with each of them. If no gradient voxel exists within the MSD, no correspondence pair is made using the examined gradient voxel of Image 1. After the examination of Image 1 is done, Image 2 is examined in the same way and more entries may be added to the list (step S3).

Once the correspondence pair list is created, it is used to find the best transformation, in a least squares sense, necessary to minimize an error metric, i.e., to bring the locations of the corresponding gradient voxels together, or nearly so (S4). In other words, a rigid body or affine transformation is found which minimizes the mean distance between corresponding gradient voxels. This correspondence transformation is then used to adjust RT (S5) and the adjusted RT is used to regenerate Image 2 (S6).

Steps S2 through S6 are repeated with the adjusted RT until the correspondence transformation is sufficiently close to the identity matrix. Once this occurs, the MSD (maximum search distance) variable is decremented (S7) and steps S2 through S6 are repeated. Once MSD is one and the correspondence transformation is sufficiently close to identity, the registration process is complete and RT is output (S8) as the registration matrix for the two images registered. Preferably, the required "closeness" to identity for the last set of iterations with MSD=1 is more rigorous than the closeness to identity for the previous iterations with MSD greater than one. If Image 2 is displayed for the user for each new RT, or for each new value of MSD (i.e., after step S6 or S7, respectively), the user can watch the convergence, stopping and adjusting input variables as needed for convergence.

Several advantages result from use of the above-described system. The use of gradients forces the registration to only consider information describing regions of intensity transition. This information is much more consistent with respect to different MR sequences than information describing voxel intensity. Also, the amount of intensity change a voxel must express in order to be considered a gradient voxel is dependent on the gradient multiplier value entered by the user. Further control over the chosen gradient voxels is given to the user through the use of allowable intensity ranges. The maximum search distance is an important concept in that it allows the process to look large distances for registration information, so that the process is much more robust than processes which only use information from neighboring voxels to do the convergence.

The least squares fit allows the registration to succeed if gradients due to the same area of tissue change do not align properly. This misalignment may be due to partial volume effects as well as interpolation occurring during the registration. It also occurs when different MR sequences emphasize a tissue differently, causing the appearance of a shift in the location of tissue change. Similarly, errors due to volume image changes, e.g., lesions or skin movements are also averaged over the entire volume image. Errors due to tissue regions which only exist in one volume image or tissue changes that only appear in one volume image are likewise averaged over the entire volume image, although it is possible that these latter conditions will result in gradient voxels which are ignored. This situation occurs if the registration transformation maps a gradient voxel in one volume image onto a location farther than the maximum search distance from any gradient voxel in the other volume image.

The present invention, as described above, provides researchers with an easy to use method of non-intensity based volume image registration which is fast, robust and automatic. The method is based on the hypothesis that, while different image formatting methods may express tissue differently, common areas of large intensity change will align approximately in a registered volume pair. Thus, one can perform registration by aligning areas of intensity transition instead of attempting to align areas of similar intensities. The convergence of the above-described process is not search based and has no direction bias. Through the use of the maximum search distance, that process also has the ability to obtain distant registration information concerning a particular gradient voxel. It is these abilities which makes the process converge correctly without premature convergence termination.

Figure 4:
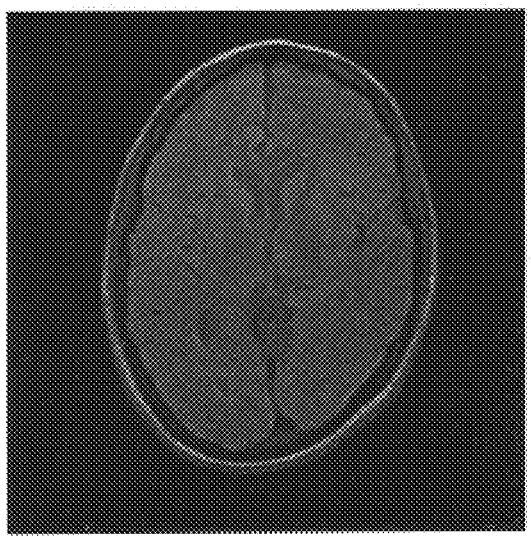
FIG. 4 is a series of image slices which might be registered. These slices are 2D images illustrating the 3D volume images stored in the image storage shown in FIG. 1.
Figure 4:
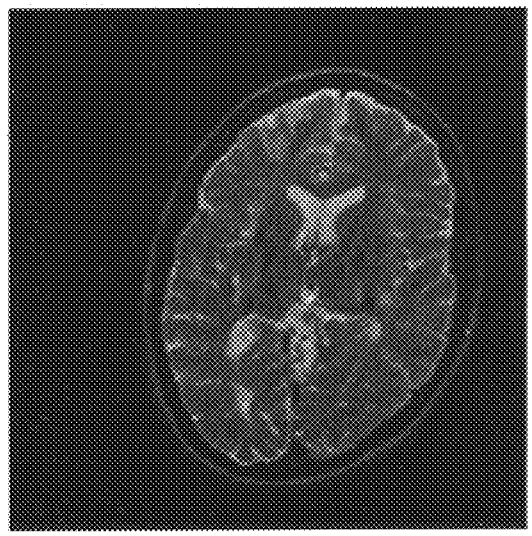
Figure 4:
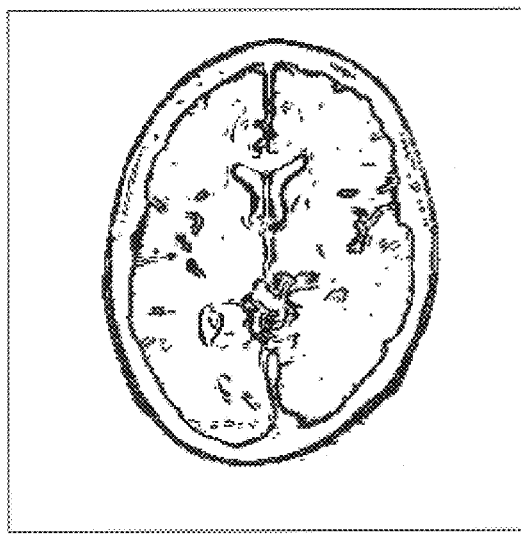
Figure 4:
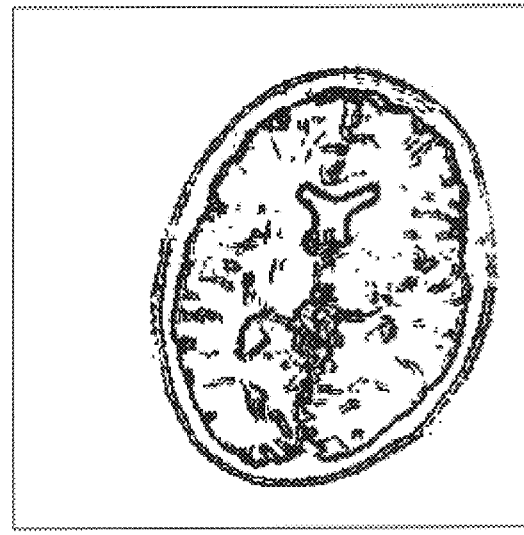
Figure 5:
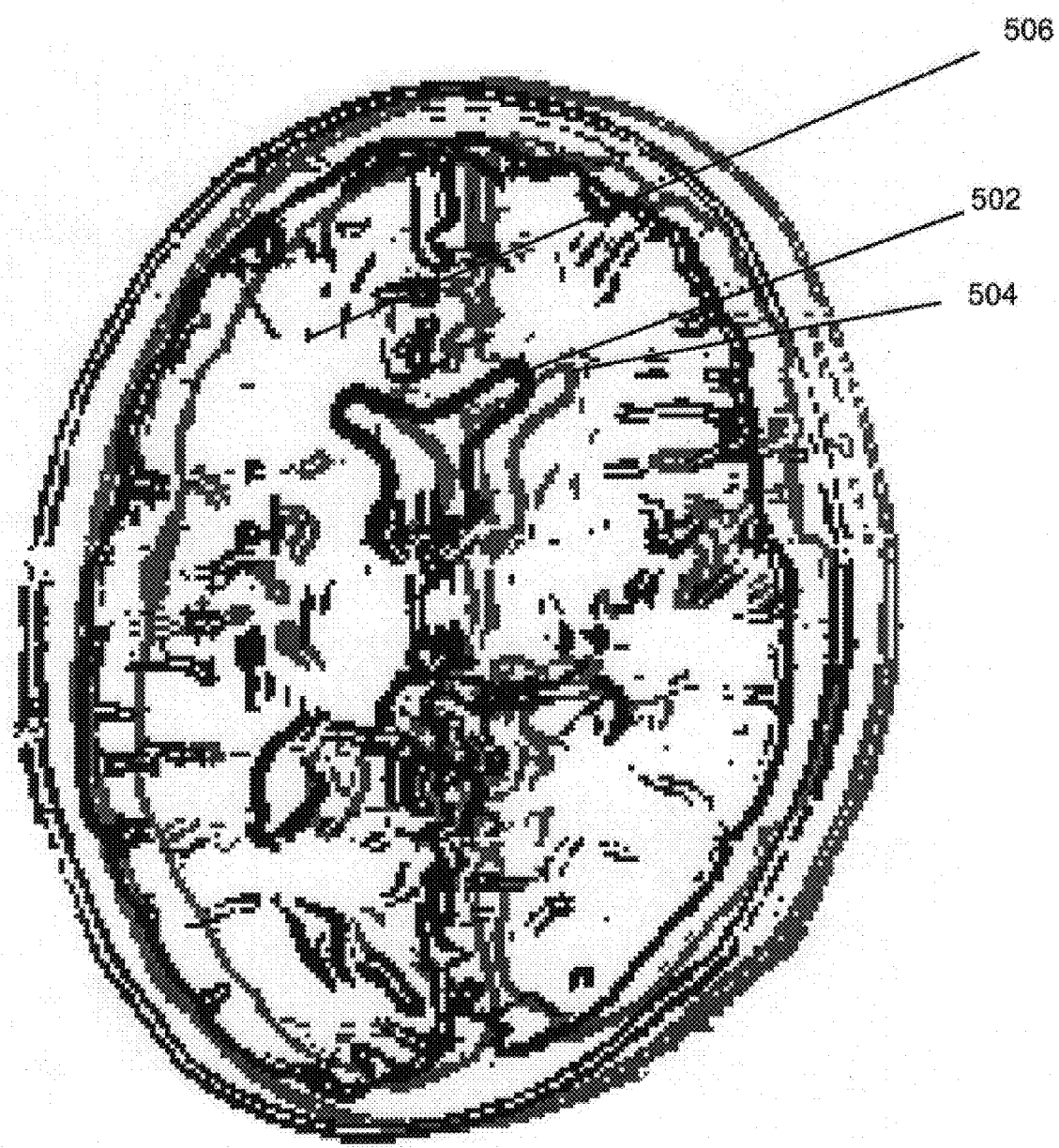
FIG. 5 is an image of two slices of a 3D scan overlaid for registration.

The registration of actual images is illustrated in FIGS. 4 and 5. FIG. 4A is a slice of a proton density volume image of the brain and FIG. 4B is a slice of a T2-weighted volume image of the same brain translated and rotated by ten degrees. FIG. 4C shows a slice along the same plane of the gradient voxel image corresponding to FIG. 4A and FIG. 4D shows a slice of the gradient voxel image corresponding to FIG. 4B. FIG. 5 shows two gradient voxel images after an initial alignment estimate. In FIGS. 4C and 4D, the gradient voxels are shown by black dots, wherein as in FIG. 5 gradient voxels from one image (protein density) are shown by gray dots and gradient voxels from the other image (T2-weighted) are shown by black dots. Several features of the images in FIG. 5 are identified. One feature 502 bears a rough correspondence to a second feature 504, and the registration process should bring these two features into alignment. As an example of a feature which has no counterpart, feature 506 of the black image has no counterpart in the gray image. Feature 506 will be ignored in the registration process as there are no corresponding gradient voxels within a maximum search distance of feature 506.

Experiments

Scans were performed on a 1.5-T MR unit (General Electric, Milwaukee, Wis.) comprising axial oblique T2-weighted, double echo TE 20/100 msec, TR 2000 msec, 27 slices, 5 mm thick, interleaved, FOV 24, matrix 128, two excitations. All data was taken monthly from four different patients participating in an I.R.B. approved study on multiple sclerosis. Registrations were performed on a Hewlett Packard 735 (99 MHz PA-RISC CPU with 128 Mb memory and 340 Mb AFS cache). This machine was dedicated to this application throughout the registrations. All visualizations were performed using the MEDx medical image processing system (Sensor Systems Inc, Sterling, Va.).

In all experiments, the gradient multipliers were 2.5 for the proton density volumes and 2.0 for the T2-weighted volumes. The allowable intensity ranges set prior to calculating the gradients were set to (100–65535) for the proton density volumes and (100–65535) for the T2-weighted volumes, where 65535 is simply the default value used with 16-bit unsigned data.

Experiment 1: Effects of Gradient Multipliers

In this first experiment the effects of changing the gradient multipliers were examined. As explained herein, the gradient multiplier is multiplied by a volume's mean 3D intensity gradient magnitude to produce the gradient threshold level. In this experiment the maximum search distance was set to 2 and the gradient multiplier values for both volumes ranged from 1.0 to 3.0 in intervals of 0.5. Using these values, ten pairs of T2-weighted volumes were registered to their corresponding proton density volumes. Since each volume pair was created simultaneously, the identity matrix was expected as the registration transformation. An error measure was defined as the mean distance between the location of each transformed voxel using the resulting registration transformation and its correct location found using the identity transformation. For each pair of input values, the mean error for these ten volume registrations was found.

Figure 6:
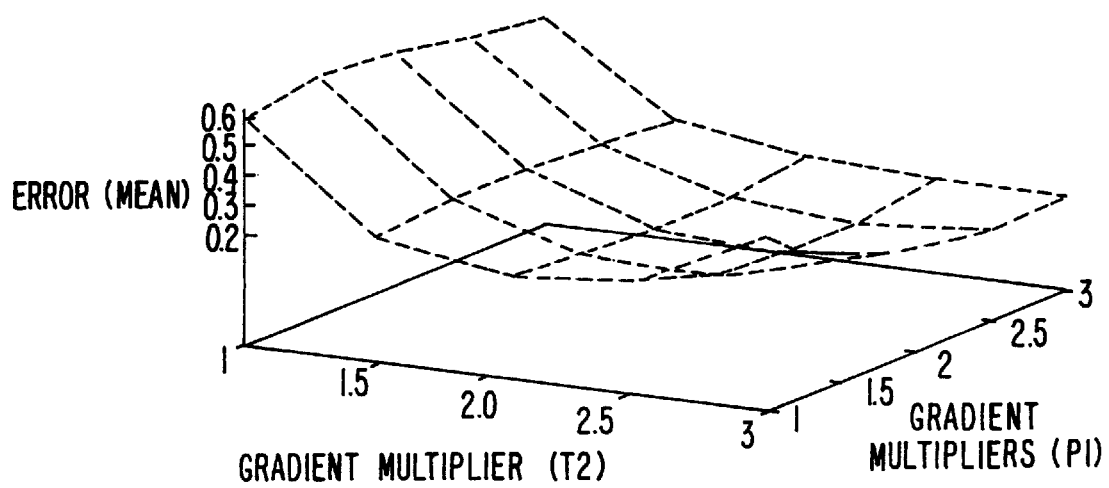
FIG. 6 is a graph of mean registration errors for ten T2-weighted, proton density volume pairs with varying gradient multipliers.

FIG. 6 is a graph of mean registration errors as a function of gradient multipliers, with the axes representing gradient multiplier values used to derive the gradient threshold level as described above. As described above, higher gradient multiplier values result in a decrease in the number of voxels with a gradient magnitude above the gradient threshold level.

These changes, however, minimally affect the registrations. Of the 25 input combinations tested, the mean errors of the ten volume registrations were all less than 0.63 millimeters. It should be noted that each registration begins by aligning the centers of intensity, so all registrations began with errors of at least 3 millimeters due to the large intensity differences occurring in the slices representing the base of the brain.

As should also be apparent from these results, the input values affecting the gradient thresholds do not have to be rigidly constrained in order to achieve a successful registration using the above-described methods. While these values do affect the registration, changes in input values are typically used for the fine tuning of speed and accuracy, where the speed is clearly related to the number of gradient voxels. As should also be apparent from these results, large numbers of mismatched gradient voxel locations do not significantly alter the registration, since most will be ignored and the errors due to the incorrectly matched gradient voxel locations are averaged throughout the entire volume.

Experiment 2: Effects of Object Position

Next, the ability of the registration process to register volumes representing different object orientations was studied. This second experiment used the ten (proton density, T2-weighted) volume pairs. For each pair, the T2-weighted volume was transformed through a known transformation and then registered to its corresponding proton density volume using the above-described process.

The process was repeated for a number of transformations for each pair. For each transformation, a unit vector was selected from the unit vectors represented in FIG. 7 (as explained below). With the center of the T2-weighted volume positioned at or assigned to the origin (0,0,0) of a three-dimensional coordinate space, the volume was rotated n degrees around the selected unit vector and then translated n millimeters towards the origin along the selected unit vector. The transformed T2-weighted volume was then registered to its corresponding proton density volume.

Figure 7:
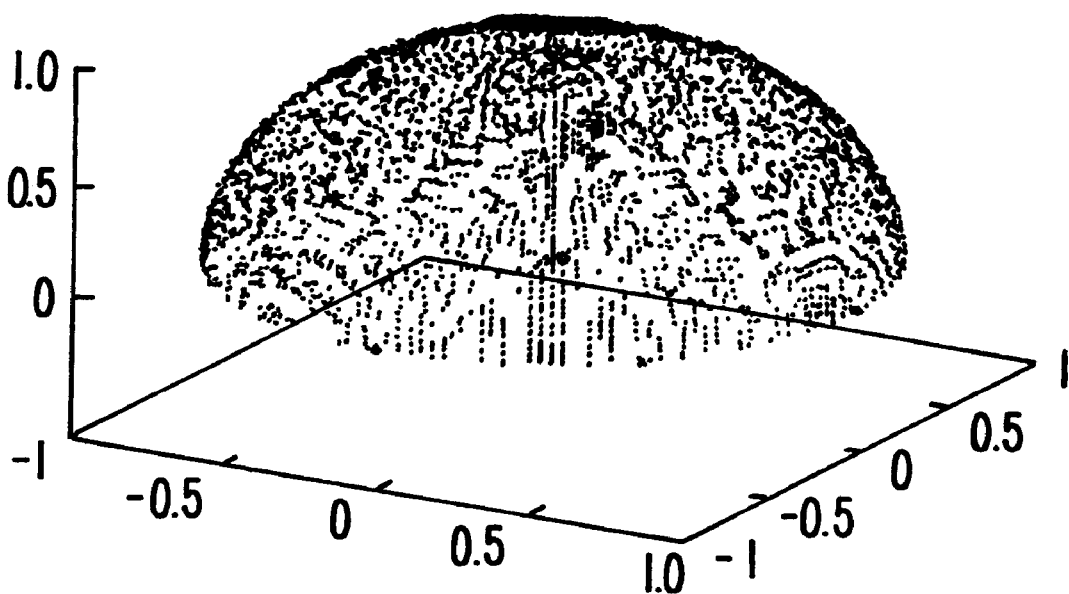
FIG. 7 is a graphical description of displacement transformations through which an image is transformed to test a registration process.

The unit vectors are represented in FIG. 7 as large dots on a semicircular field. The unit vectors are evenly spaced throughout the upper half of a unit sphere with angular increments of 45 degrees. For example, one such unit vector is the unit vector lying on the positive x axis. The end of that unit vector is represented by the large dot located at the point (1,0,0). When that unit vector was used to transform a T2-weighted volume, the volume was centered on the origin, rotated n degrees around the x axis and then translated n millimeters along the x axis before being registered.

The registration process was done using each unit vector, on all ten volume pairs, for n=5, 15 and 25, resulting in 10×17×3, or 510, total registrations. The maximum search distance was set to 2, 4 and 8 for n values of 5, 15 and 25, respectively. The error term used was identical to the one described for the previous experiment, except that instead of the identity transformation, the known transformations were based on the unit vectors shown in FIG. 7.

Significantly, the volumes used for these registrations were found by transforming an existing volume instead of repositioning and rescanning a subject or a phantom. The main difference between these two methods is that an existing volume is limited in the amount of information it can provide. As the volume is transformed, the information necessary to correctly represent the complete volume is not present. Thus, many of these registrations were done using volumes containing a large amount of missing data.

Figure 8:
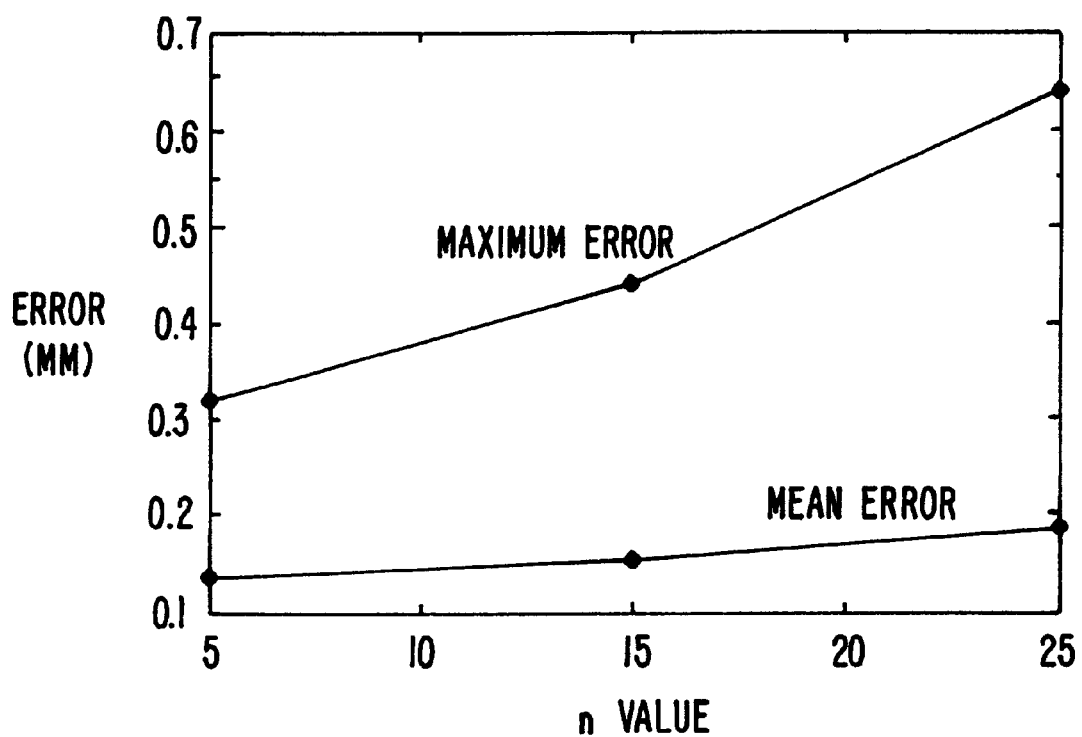
FIG. 8 is a graph of registration errors from registrations performed using a correspondence of closest gradient voxels process.
Figure 9:
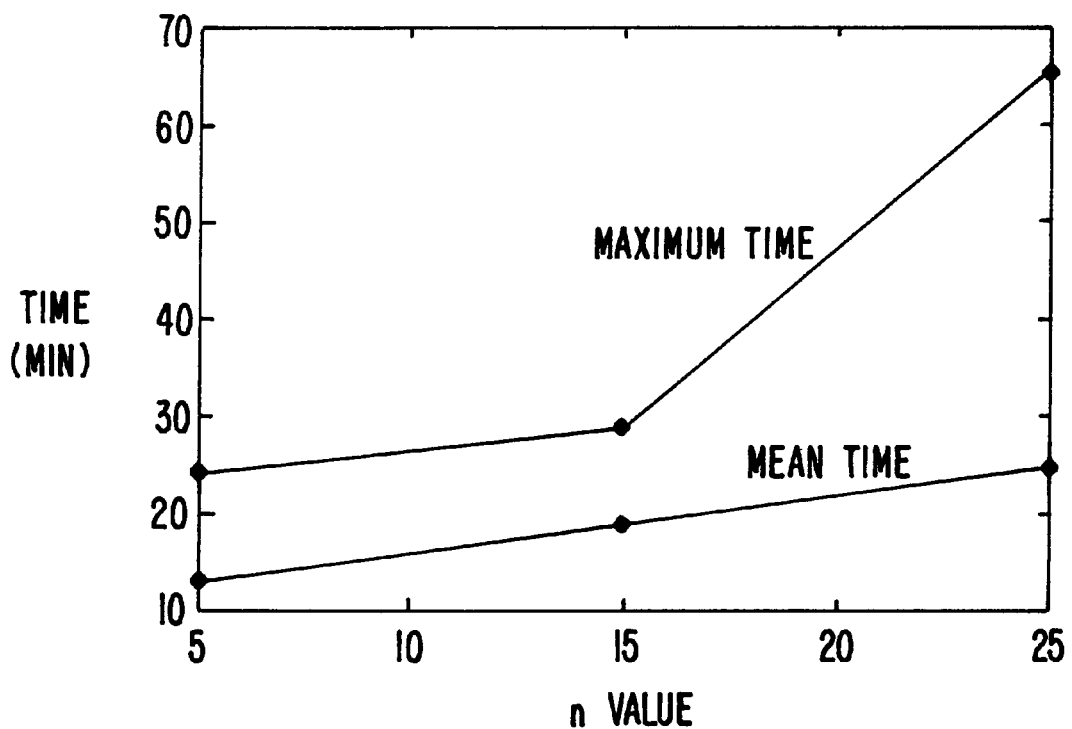
FIG. 9 is a graph of registration times from registrations performed using the correspondence of closest gradient voxels process.

FIGS. 8–9 show the results of the second experiment. FIG. 8 is a graph of the registration errors for different values of n (the amount of rotation and translation). As expected, the error is greater for larger values of n, because the larger values represent larger rotations and translations which resulted in greater loss of test data. However, even with large movements of the T2-weighted volumes, the mean registration error for all data was less than 0.20 mm. FIG. 9 is a graph of the registration time for different values of n. Likewise, the registration time is greater for larger values of n. As FIG. 9 shows, the mean registration time for all data was less than 30 minutes.

These results show the robustness of the process described herein with respect to movement as well as with respect to missing data.

The above description is illustrative and not restrictive. Many variations of the invention will become apparent to those of skill in the art upon review of this disclosure. For example, the registration can be performed on non-MR data.

Another variation of the above-described system is a system for registering 2D images using closest corresponding pixels in an iterative registration process. In a specific embodiment of such a 2D registration process, two binary gradient images are generated from two 2D images using a 2D gradient function (such as the function shown in Equation 1 without the $\Delta z$ term), with range limits and a variable gradient threshold. The two binary gradient images are then registered using a process similar to a process described above for 3D volume images, except that the transformation is a 2D transformation instead of a 3D transformation. The pairing of correspondence pixels in the two images is similar to the pairing of correspondence voxels for two volume images described above.

The scope of the invention should, therefore, be determined not with reference to the above description, but instead should be determined with reference to the appended claims along with their full scope of equivalents.

What is claimed is:

1. A method of registering three-dimensional (3D) volume images, wherein a volume image is represented by an array of voxel color values characterizing physical parameters of a volume of a 3D object, wherein the 3D object is characterized, at least in part, by the volume images being registered, the method comprising the steps of:

capturing a first volume image, the first volume image characterizing a first set of physical characteristics of a scanned 3D object;

capturing a second volume image, the second volume image characterizing a second set of physical characteristics of the scanned 3D object;

generating voxel pairs, wherein each voxel pair comprises a first voxel from a first of the two volume images and a second voxel from the second of the two volume images, when the second voxel has a characteristic that is common to both the first voxel and the second voxel and the second voxel is at least as close to the first voxel as any other voxel in the second volume image having the characteristic; and iteratively determining a registration transformation from the generated voxel pairs, where the registration transformation is a transformation relating the two volume images.

2. The method of claim 1, wherein the characteristic that is in common is a characteristic of the first voxel and the second voxel having a common value for a voxel property.

3. The method of claim 1, wherein the characteristic that is in common is a characteristic of the first voxel and the second voxel having similar values for a voxel property.

4. The method of claim 3, wherein the similar values are both values within a predetermined range of values.

5. The method of either claim 2 or claim 3, wherein the voxel property is a function of a voxel intensity.

6. The method of either claim 2 or claim 3, wherein the voxel property is a function of a voxel intensity gradient.

7. The method of either claim 2 or claim 3, wherein the voxel property is a function of a voxel intensity value and neighboring voxel intensity values.

8. The method of either claim 2 or claim 3, wherein the voxel property is a function of a binarized voxel intensity gradient.

9. The method of claim 1, wherein the step of generating voxel pairs excludes voxels meeting a predetermined exclusion criteria.

10. The method of claim 9, wherein the predetermined exclusion criteria is a function of voxel color value.

11. The method of claim 9, wherein the predetermined exclusion criteria is a function of voxel intensity.

12. The method of claim 9, wherein the predetermined exclusion criteria is whether a voxel has an intensity value within an exclusion range.

13. The method of claim 9, wherein the predetermined exclusion criteria is whether a voxel has an intensity value outside an inclusion range.

14. The method of claim 9, wherein the predetermined exclusion criteria is a function of voxel location.

15. The method of claim 9, wherein the predetermined exclusion criteria is whether a voxel is located within an exclusion range.

16. The method of claim 9, wherein the predetermined exclusion criteria is whether a voxel is located outside an inclusion range.

17. A method of registering two-dimensional (2D) images, wherein an image is represented by an array of pixel color values characterizing physical parameters of an area of an object, wherein the object is characterized, at least in part, by the images being registered, the method comprising the steps of:

capturing a first image characterizing a first set of physical characteristics of a scanned object;

capturing a second image characterizing a second set of physical characteristics of the scanned object;

generating pixel pairs wherein each pixel pair comprises a first pixel from a first of the two images and a second pixel from the second of the two images, when the second pixel has a characteristic that is common to both the first pixel and the second pixel and the second pixel is at least as close to the first pixel as any other pixel in the second image having the characteristic; and iteratively determining a registration transformation from the generated pixel pairs, where the registration transformation is a transformation relating the two images.

18. The method of claim 17, further comprising the steps of:

generating a second set of pixel pairs, wherein each pixel pair in the second set of pixel pairs comprises a first pixel from the first image and a second pixel from the second image, when the first pixel has a characteristic that is common to both the first pixel and the second pixel and the first pixel is at least as close to the second pixel as any other pixel in the first image having the characteristic; and wherein the step of iteratively determining a registration transformation is performed using the pixel pairs generated in the step of generating pixel pairs and using the pixel pairs generated in the step of generating the second set of pixel pairs.

19. The method of claim 1, further comprising the steps of:

generating a second set of voxel pairs, wherein each voxel pair in the second set of voxel pairs comprises a first voxel from the first volume image and a second voxel from the second volume image, when the first voxel has a characteristic that is common to both the first voxel and the second voxel and the first voxel is at least as close to the second voxel as any other voxel in the first volume image having the characteristic; and wherein the step of iteratively determining a registration transformation is performed using the voxel pairs generated in the step of generating voxel pairs and using the voxel pairs generated in the step of generating the second set of voxel pairs.

* * * * *